United States Patent
Yasuda (10) Patent No.: US 6,653,652 B2
(45) Date of Patent: Nov. 25, 2003

(54) RADIATION IMAGE READ-OUT METHOD AND APPARATUS

(75) Inventor: Hiroaki Yasuda, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 22 days.

(21) Appl. No.: 09/878,201

(22) Filed: Jun. 12, 2001

(65) Prior Publication Data

US 2002/0003218 A1 Jan. 10, 2002

(30) Foreign Application Priority Data

Jun. 12, 2000 (JP) .................................... 2000-174649

(51) Int. Cl.⁷ .............................................. G03B 42/08
(52) U.S. Cl. .................... 250/584; 250/586; 250/587
(58) Field of Search ........................... 250/584, 586, 250/587, 339.02, 339.09, 341.5

(56) References Cited

U.S. PATENT DOCUMENTS

| | | | |
|---|---|---|---|
| 4,816,679 A | 3/1989 | Sunagawa et al. | 250/327.2 |
| 4,883,961 A * | 11/1989 | Arakawa et al. | 250/584 |
| 4,922,103 A | 5/1990 | Kawajiri et al. | 250/327.2 |
| 5,028,783 A * | 7/1991 | Arakawa | 250/587 |
| 5,038,037 A * | 8/1991 | Saotome | 250/583 |
| 5,229,618 A * | 7/1993 | Nakajima | 250/559.02 |
| 5,455,428 A * | 10/1995 | Miyagawa | 250/585 |
| 5,654,556 A * | 8/1997 | Yasuda | 250/584 |
| 5,760,416 A * | 6/1998 | Tsuchiya, deceased | 250/584 |
| 2002/0044781 A1 * | 4/2002 | Creasey et al. | 396/661 |

FOREIGN PATENT DOCUMENTS

| | | | |
|---|---|---|---|
| JP | 60-111568 | 6/1985 | H04N/1/04 |
| JP | 60-236354 | 11/1985 | H04N/1/04 |
| JP | 1-101540 | 4/1989 | G03B/42/02 |
| JP | 01-101540 A * | 4/1989 | G03B/42/02 |

* cited by examiner

*Primary Examiner*—Albert Gagliardi
(74) *Attorney, Agent, or Firm*—Sughrue Mion, PLLC

(57) ABSTRACT

Stimulating rays produced by a line light source are linearly irradiated onto an area of a stimulable phosphor sheet, on which a radiation image has been stored. Light, which is emitted from the linear area of the sheet exposed to the linear stimulating rays, is received and photoelectrically converted by a line sensor. Outputs of the line sensor are corrected in accordance with variation in sensitivity among a plurality of pixel regions of the line sensor, which pixel regions are arrayed along the length direction of the linear area of the stimulable phosphor sheet.

16 Claims, 3 Drawing Sheets

SECT. I—I

RADIATION IMAGE READ-OUT METHOD AND APPARATUS

BACKGROUND OF THE INVENTION

1. Field of the Invention

This invention relates to a radiation image read-out method and apparatus. This invention particularly relates to a radiation image read-out method and apparatus, wherein a radiation image having been stored on a stimulable phosphor sheet is read out with a line sensor.

2. Description of the Related Art

It has been proposed to use stimulable phosphors in radiation image recording and reproducing systems. Specifically, a radiation image of an object, such as a human body, is recorded on a stimulable phosphor sheet, which comprises a substrate and a layer of the stimulable phosphor overlaid on the substrate. Stimulating rays, such as a laser beam, are deflected and caused to scan pixels in the radiation image, which has been stored on the stimulable phosphor sheet, one after another. The stimulating rays cause the stimulable phosphor sheet to emit light in proportion to the amount of energy stored thereon during its exposure to the radiation. The light emitted successively from the pixels in the radiation image having been stored on the stimulable phosphor sheet, upon stimulation thereof, is photoelectrically detected and converted into an electric image signal by photoelectric read-out means. The stimulable phosphor sheet, from which the image signal has been detected, is then exposed to erasing light, and radiation energy remaining thereon is thereby released.

Also, a novel radiation image recording and reproducing system aiming at enhancement of a detection quantum efficiency in the formation of the radiation image, i.e., a radiation absorptivity, a light emission efficiency, an emitted light pickup efficiency, and the like, has been proposed in, for example, Japanese Patent Application No. 11(1999)-372978. With the proposed radiation image recording and reproducing system, the radiation absorbing functions and the energy storing functions of the conventional stimulable phosphor are separated from each other, and a phosphor having good radiation absorbing characteristics and a phosphor having good light emission response characteristics are utilized respectively for radiation absorption and radiation image storage. The phosphor having good radiation absorbing characteristics (i.e., the phosphor for radiation absorption) is caused to absorb the radiation and to emit light having wavelengths falling within an ultraviolet to visible region. Also, the phosphor having good light emission response characteristics (i.e., the phosphor for energy storage) is caused to absorb the light, which has been emitted by the phosphor having good radiation absorbing characteristics, and to store energy of the emitted light. The phosphor having good light emission response characteristics, on which the energy of the emitted light has been stored, is then exposed to light having wavelengths falling within a visible to infrared region, which light causes the phosphor having good light emission response characteristics to emit light in accordance with the stored energy. The light having thus been emitted by the phosphor having good light emission response characteristics is successively detected with photoelectric read-out means, and an image signal is thereby obtained.

The image signal, which has been obtained from the radiation image recording and reproducing systems described above, is then subjected to image processing, such as gradation processing and processing in the frequency domain, such that a visible radiation image, which has good image quality and can serve as an effective tool in, particularly, the efficient and accurate diagnosis of an illness, can be obtained. The image signal having been obtained from the image processing is utilized for reproducing a visible image for diagnosis, or the like, on film or on a high resolution cathode ray tube (CRT) display device. In cases where the stimulable phosphor sheet, from which the image signal has been detected, is then exposed to the erasing light, and energy remaining on the stimulable phosphor sheet is thereby released, the erased stimulable phosphor sheet is capable of being used again for the recording of a radiation image.

Novel radiation image read-out apparatuses for use in the radiation image recording and reproducing systems described above have been proposed in, for example, Japanese Unexamined Patent Publication Nos. 60(1985)-111568, 60(1985)-236354, and 1(1989)-101540. In the proposed radiation image read-out apparatuses, from the point of view of keeping the emitted light detection time short, reducing the size of the apparatus, and keeping the cost low, a line light source for irradiating linear stimulating rays onto a stimulable phosphor sheet is utilized as a stimulating ray source, and a line sensor comprising a plurality of photoelectric conversion devices arrayed along the length direction of a linear area of the stimulable phosphor sheet, onto which linear area the stimulating rays are irradiated by the line light source, is utilized as photoelectric read-out means. (The length direction of the linear area of the stimulable phosphor sheet will hereinbelow be referred to as the main scanning direction.) Also, the proposed radiation image read-out apparatuses comprise scanning means for moving the stimulable phosphor sheet with respect to the line light source and the line sensor and in a direction, which is approximately normal to the length direction of the linear area of the stimulable phosphor sheet. (The direction, which is approximately normal to the length direction of the linear area of the stimulable phosphor sheet, will hereinbelow be referred to as the sub-scanning direction.)

However, the line sensor utilized in the radiation image recording and reproducing systems described above comprises the plurality of the photoelectric conversion devices arrayed along the main scanning direction, and the photoelectric conversion devices exhibit variation in sensitivity with respect to light emitted by the stimulable phosphor sheet. Therefore, the problems occur in that noise due to the variation in sensitivity with respect to light emitted by the stimulable phosphor sheet mixes in the output of the line sensor, and an image having good image quality cannot be obtained. For example, in cases where the line sensor is constituted of a charge coupled device (CCD) image sensor, which comprises a plurality of photodiodes (PD's) acting as the photoelectric conversion devices, the PD's are independent from one another, and the sensitivities of the PD's are not identical with one another. Therefore, in such cases, such that an image having good image quality may be obtained, it is necessary for the outputs obtained from the respective PD's to be corrected in accordance with the variation in sensitivity among the PD's constituting the CCD image sensor.

Figure 6:
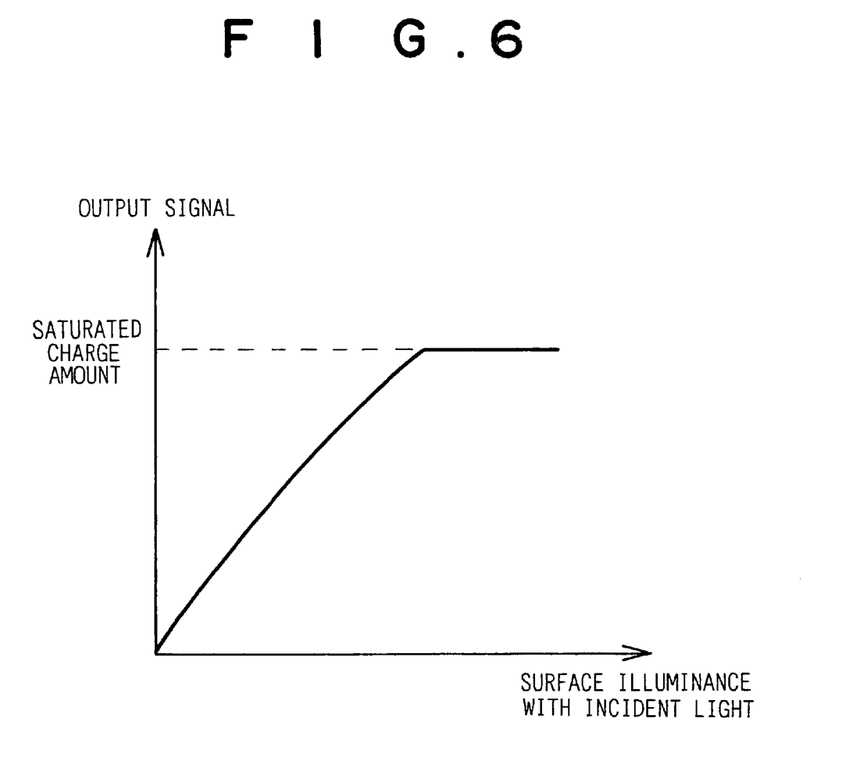
FIG. 6 is a graph showing relationship between an electric charge amount obtained from a PD and a surface illuminance.

Also, as illustrated in FIG. 6, in the cases of the CCD image sensor, the relationship between the output signal (i.e., the electric charge amount), which is obtained from each PD acting as the photoelectric conversion device, and the surface illuminance of light incident upon the PD is such that the relationship is approximately linear (i.e., the PD has linearity) until saturation is reached in the electric charge amount. However, the linearity of the PD does not exactly form a straight line. Therefore, in cases where correction values for the correction of the outputs obtained from the respective photoelectric conversion devices (in this example, the PD's) are to be calculated, such that accurate correction effects may be obtained, it is necessary for the correction value for the correction of the output of each PD to be calculated in accordance with the level of the surface illuminance on the PD.

SUMMARY OF THE INVENTION

The primary object of the present invention is to provide a radiation image read-out method, wherein noise due to variation in sensitivity among photoelectric conversion devices constituting a line sensor is capable of being eliminated, and an image having good image quality is capable of being obtained.

Another object of the present invention is to provide an apparatus for carrying out the radiation image read-out method.

The present invention provides a radiation image read-out method, comprising the steps of:

i) linearly irradiating stimulating rays, which have been produced by a line light source, onto an area of one surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, with a line sensor comprising a plurality of photoelectric conversion devices, the received light being subjected to photoelectric conversion performed by the line sensor, iii) moving the stimulable phosphor sheet with respect to the line light source and the line sensor and in a direction different from a length direction of the linear area of the stimulable phosphor sheet, and iv) successively reading outputs of the line sensor in accordance with the movement, outputs of the photoelectric conversion devices at respective positions of movement being thereby obtained, wherein the outputs of the line sensor are corrected in accordance with variation in sensitivity among a plurality of pixel regions of the line sensor, which pixel regions are arrayed along the length direction of the linear area of the stimulable phosphor sheet.

In the radiation image read-out method in accordance with the present invention, as the line light source, a fluorescent lamp, a cold cathode fluorescent lamp, a light emitting diode (LED) array, or the like, may be employed. The line light source may be a light source having a linear shape as in the cases of the fluorescent lamp. Alternatively, the line light source may be a light source operating such that the produced stimulating rays are formed into a line light beam. For example, the line light source may be a broad area laser, or the like. The stimulating rays radiated out from the line light source may be radiated out continuously. Alternatively, the stimulating rays radiated out from the line light source may be radiated out as pulsed stimulating rays, which are radiated out intermittently. From the point of view of reducing noise, the stimulating rays should preferably be pulsed stimulating rays having a high intensity.

As will be understood from the specification, it should be noted that the term "moving a stimulable phosphor sheet with respect to a line light source and a line sensor" as used herein means movement of the stimulable phosphor sheet relative to the line light source and the line sensor, and embraces the cases wherein the stimulable phosphor sheet is moved while the line light source and the line sensor are kept stationary, the cases wherein the line light source and the line sensor are moved while the stimulable phosphor sheet is kept stationary, and the cases wherein both the stimulable phosphor sheet and the line light source and the line sensor are moved. In cases where the line light source and the line sensor are moved, they should be moved together with each other.

The direction along which the stimulable phosphor sheet is moved with respect to the line light source and the line sensor (i.e., the direction different from the length direction of the exposed linear area of the stimulable phosphor sheet) should preferably be the direction approximately normal to the length direction of the exposed linear area of the stimulable phosphor sheet (i.e., should preferably be the minor axis direction). However, the direction along which the stimulable phosphor sheet is moved with respect to the line light source and the line sensor is not limited to the minor axis direction. For example, the stimulable phosphor sheet may be moved with respect to the line light source and the line sensor along an oblique direction with respect to the direction approximately normal to the length direction of the line light source and the line sensor or along a zigzag movement direction, such that approximately the entire surface of the stimulable phosphor sheet maybe uniformly exposed to the stimulating rays.

The line light source and the line sensor maybe located on the same surface side of the stimulable phosphor sheet or on opposite surface sides of the stimulable phosphor sheet. In cases where the line light source and the line sensor are located on opposite surface sides of the stimulable phosphor sheet, the substrate of the stimulable phosphor sheet, or the like, should be formed from a material permeable to the emitted light, such that the emitted light may permeate to the surface side of the stimulable phosphor sheet opposite to the surface on the stimulating ray incidence side.

Also, in the radiation image read-out method in accordance with the present invention, the stimulable phosphor sheet for storing the radiation image may be an ordinary stimulable phosphor sheet comprising a stimulable phosphor for absorbing radiation and storing energy from the radiation, i.e. the radiation image.

Further, the radiation image read-out method in accordance with the present invention may be employed in the radiation image recording and reproducing system proposed in, for example, Japanese Patent Application No. 11(1999)-372978. With the proposed radiation image recording and reproducing system, the radiation absorbing functions and the energy storing functions of the conventional stimulable phosphor are separated from each other, and a phosphor having good radiation absorbing characteristics and a phosphor having good light emission response characteristics are utilized respectively for radiation absorption and radiation image storage. The phosphor having good radiation absorbing characteristics (i.e., a phosphor for radiation absorption) is caused to absorb the radiation and to emit light having wavelengths falling within an ultraviolet to visible region. Also, the phosphor having good light emission response characteristics (i.e., a phosphor for energy storage) is caused to absorb the light, which has been emitted by the phosphor having good radiation absorbing characteristics, and to store energy of the emitted light. The phosphor having good light emission response characteristics, on which the energy of the emitted light has been stored, is then exposed to light having wavelengths falling within a visible to infrared region, which light causes the phosphor having good light emission response characteristics to emit light in accordance with the stored energy. The light having thus been emitted by the phosphor having good light emission response characteristics is successively detected with photoelectric read-out means, and an image signal is thereby obtained. With the proposed radiation image recording and reproducing system, the detection quantum efficiency in the formation of the radiation image, i.e., the radiation absorptivity, the light emission efficiency, the emitted light pickup efficiency, and the like, is capable of being enhanced as a whole. Therefore, in the radiation image read-out method in accordance with the present invention, the stimulable phosphor sheet should preferably contain the phosphor for energy storage described above.

The phosphor for energy storage absorbs the light having wavelengths falling within the ultraviolet to visible region, which light has been emitted by the phosphor for radiation absorption, and stores the energy of the emitted light as the image information. The light having wavelengths falling within the ultraviolet to visible region is the light emitted by the phosphor for radiation absorption when the phosphor for radiation absorption absorbs the radiation. Therefore, the image information having been stored on the phosphor for energy storage is also taken as the radiation image.

The radiation image read-out method in accordance with the present invention is characterized by correcting the outputs of the line sensor in accordance with variation in sensitivity among the plurality of the pixel regions of the line sensor, which pixel regions are arrayed along the length direction of the linear area of the stimulable phosphor sheet. The correction should preferably be performed in the manner described below. Specifically, light having a known light intensity distribution along the length direction of the linear area of the stimulable phosphor sheet may be projected onto the line sensor, and a correction value may be calculated with respect to each of the pixel regions of the line sensor and in accordance with outputs of the pixel regions of the line sensor, which outputs are obtained when the pixel regions of the line sensor receive the projected light. Also, when the radiation image is read out from the stimulable phosphor sheet, the output of each of the pixel regions of the line sensor, which output is obtained when each of the pixel regions of the line sensor receives the light emitted by the stimulable phosphor sheet, may be corrected in accordance with the thus calculated correction value.

The light having the known light intensity distribution along the length direction of the linear area of the stimulable phosphor sheet is the light projected onto the line sensor over the entire area of the light receiving region of the line sensor for the calculation of the correction values. The light having the known light intensity distribution along the length direction of the linear area of the stimulable phosphor sheet is not limited to a linear light beam. However, the light having the known light intensity distribution along the length direction of the linear area of the stimulable phosphor sheet should preferably be a linear light beam.

Ordinarily, the intensity of the stimulating rays, which are linearly irradiated from the line light source onto the stimulable phosphor sheet, is uniform along the length direction of the linear area of the stimulable phosphor sheet. Therefore, the light having the known light intensity distribution along the length direction of the linear area of the stimulable phosphor sheet should preferably be light having uniform light intensity distribution along the length direction of the linear area of the stimulable phosphor sheet.

Also, it may often occurs that the linear stimulating rays, which are irradiated from the line light source onto the stimulable phosphor sheet when the radiation image is to be read out from the stimulable phosphor sheet, has a certain light intensity distribution along the length direction of the linear area of the stimulable phosphor sheet. Therefore, such that more accurate correction effects may be obtained, more accurate correction values should preferably be calculated by linearly projecting light, which has a light intensity distribution corresponding to the light intensity distribution of the stimulating rays along the length direction of the linear area of the stimulable phosphor sheet, onto the line sensor.

Further, as described above, the linearity of each of the photoelectric conversion devices of the line sensor does not exactly form a straight line. Therefore, the radiation image read-out method in accordance with the present invention should more preferably be modified such that correction values, each of which corresponds to one of at least two different levels of incident light intensities upon each of the pixel regions of the line sensor, are calculated, and the output of each of the pixel regions of the line sensor, which output is obtained when each of the pixel regions of the line sensor receives the light emitted by the stimulable phosphor sheet, is corrected in accordance with a level of an incident light intensity of the emitted light and in accordance with the thus calculated correction values, each of which corresponds to one of the at least two different levels of the incident light intensities.

Furthermore, the projection of the light onto the line sensor and the calculation of the correction values should preferably be performed with one of the techniques described under (1), (2), and (3) below.

(1) The stimulating rays are irradiated onto an area of one surface of a stimulable phosphor sheet, on which a predetermined amount of energy has been stored approximately uniformly (and which has been obtained by irradiating uniform amount of radiation to an entire surface of the stimulable phosphor sheet, i.e. which has been obtained from uniform exposure to the radiation), the light, which is emitted from the exposed area of the one surface of the stimulable phosphor sheet exposed to the stimulating rays or from an area of the other surface of the stimulable phosphor sheet corresponding to the exposed area of the one surface of the stimulable phosphor sheet when the stimulating rays are irradiated onto the exposed area of the one surface of the stimulable phosphor sheet, is received with the line sensor, and the correction value with respect to each of the pixel regions of the line sensor is calculated in accordance with the outputs of the pixel regions of the line sensor, which outputs are obtained when the pixel regions of the line sensor receive the light emitted by the stimulable phosphor sheet.

The technique described under (1) has the advantages in that the line light source employed for the radiation image readout from the stimulable phosphor sheet, on which the radiation image has been stored, is capable of being utilized for the projection of the light onto the line sensor for the calculation of the correction value, and in that nonuniformity of the light guiding optical system and nonuniformity of the stimulation optical system are capable of being compensated for.

(2) Stimulating rays are irradiated onto an area of one surface of a uniform, anti-Stokes' type of phosphor sheet, light, which is radiated out from the exposed area of the one surface of the anti-Stokes' type of the phosphor sheet exposed to the stimulating rays or from an area of the other surface of the anti-Stokes' type of the phosphor sheet corresponding to the exposed area of the one surface of the anti-Stokes' type of the phosphor sheet when the stimulating rays are irradiated onto the exposed area of the one surface of the anti-Stokes' type of the phosphor sheet, is received with the line sensor, and the correction value with respect to each of the pixel regions of the line sensor is calculated in accordance with the outputs of the pixel regions of the line sensor, which outputs are obtained when the pixel regions of the line sensor receive the light radiated out from the anti-Stokes' type of the phosphor sheet.

The term "anti-Stokes' type of phosphor sheet" as used herein means the phosphor sheet, which does not store energy of received light as in the cases of the stimulable phosphor sheet, and which is formed from a phosphor having the properties such that, when the phosphor receives light, the phosphor radiates out light having wavelengths falling within a wavelength region different from the wavelength region of the received light.

The technique described under (2) has the advantages in that an operation for exposing the phosphor sheet to light need not be performed before the stimulating rays are irradiated to the phosphor sheet for the calculation of the correction value.

As a light source for producing the stimulating rays utilized in the technique described under (2), the line light source, which is employed for the radiation image readout from the stimulable phosphor sheet, may be utilized.

(3) Light, which is produced by a reference light source, is projected onto the line sensor, and the correction value with respect to each of the pixel regions of the line sensor is calculated in accordance with the outputs of the pixel regions of the line sensor, which outputs are obtained when the pixel regions of the line sensor receive the light produced by the reference light source.

The technique described under (3) has the advantages in that the stimulable phosphor sheet obtained from uniform exposure to the radiation or the anti-Stokes' type of the phosphor sheet need not be prepared for the calculation of the correction value. The reference light source utilized in the technique described under (3) is the light source, which is different from the line light source for the radiation image readout from the stimulable phosphor sheet, and which is provided for the compensation for variation in sensitivity among the pixel regions of the line sensor. The reference light source should preferably be constituted of one of an electroluminescence (EL) device, a light emitting diode (LED) array, and a laser diode (LD) array.

The present invention also provides an apparatus for carrying out the radiation image read-out method in accordance with the present invention. Specifically, the present invention also provides a radiation image read-out apparatus, comprising:

i) a line light source for linearly irradiating stimulating rays on to an area of one surface of a stimulable phosphor sheet, on which a radiation image has been stored, the stimulating rays causing the stimulable phosphor sheet to emit light in proportion to an amount of energy stored thereon during its exposure to radiation, ii) a line sensor comprising a plurality of photoelectric conversion devices for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, iii) scanning means for moving the stimulable phosphor sheet with respect to the line light source and the line sensor and in a direction different from a length direction of the linear area of the stimulable phosphor sheet, and iv) reading means for successively reading outputs of the line sensor in accordance with the movement in order to obtain outputs of the photoelectric conversion devices at respective positions of movement performed by the scanning means, wherein the improvement comprises the provision of correction means for correcting the outputs of the line sensor in accordance with variation in sensitivity among a plurality of pixel regions of the line sensor, which pixel regions are arrayed along the length direction of the linear area of the stimulable phosphor sheet.

In the radiation image read-out apparatus in accordance with the present invention, such that the detection quantum efficiency in the formation of the radiation image may be enhanced and an image having good image quality may be obtained, the stimulable phosphor sheet should preferably contain a stimulable phosphor, which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

The radiation image read-out apparatus in accordance with the present invention is characterized by being provided with the correction means for correcting the outputs of the line sensor in accordance with variation in sensitivity among the plurality of pixel regions of the line sensor, which pixel regions are arrayed along the length direction of the linear area of the stimulable phosphor sheet. The correction means should preferably comprise light projecting means for projecting light, which has a known light intensity distribution along the length direction of the linear area of the stimulable phosphor sheet, onto the line sensor, and operation processing means for calculating a correction value with respect to each of the pixel regions of the line sensor and in accordance with outputs of the pixel regions of the line sensor, which outputs are obtained when the pixel regions of the line sensor receive the projected light, and correcting the output of each of the pixel regions of the line sensor, which output is obtained when each of the pixel regions of the line sensor receives the light emitted by the stimulable phosphor sheet, in accordance with the thus calculated correction value.

Ordinarily, the intensity of the stimulating rays, which are linearly irradiated from the line light source onto the stimulable phosphor sheet, is uniform along the length direction of the linear area of the stimulable phosphor sheet. Therefore, in the radiation image read-out apparatus in accordance with the present invention, the light having the known light intensity distribution along the length direction of the linear area of the stimulable phosphor sheet should preferably be light having uniform light intensity distribution along the length direction of the linear area of the stimulable phosphor sheet.

Also, it may often occurs that the linear stimulating rays, which are irradiated from the line light source onto the stimulable phosphor sheet when the radiation image is to be read out from the stimulable phosphor sheet, has a certain light intensity distribution along the length direction of the linear area of the stimulable phosphor sheet. Therefore, in order for more accurate correction effects to be obtained, the radiation image read-out apparatus in accordance with the present invention should more preferably be modified such that the correction means comprises the light projecting means for linearly projecting light, which has a light intensity distribution corresponding to the light intensity distribution of the stimulating rays along the length direction of the linear area of the stimulable phosphor sheet, onto the line sensor, and the operation processing means for calculating the correction value with respect to each of the pixel regions of the line sensor and in accordance with the outputs of the pixel regions of the line sensor, which outputs are obtained when the pixel regions of the line sensor receive the projected light, and the incident light intensity, and correcting the output of each of the pixel regions of the line sensor, which output is obtained when each of the pixel regions of the line sensor receives the light emitted by the stimulable phosphor sheet, in accordance with the thus calculated correction value.

Further, as described above, the linearity of each of the photoelectric conversion devices of the line sensor does not exactly form a straight line. Therefore, the radiation image read-out apparatus in accordance with the present invention should more preferably be modified such that the correction means calculates correction values, each of which corresponds to one of at least two different levels of incident light intensities upon each of the pixel regions of the line sensor, and the correction means corrects the output of each of the pixel regions of the line sensor, which output is obtained when each of the pixel regions of the line sensor receives the light emitted by the stimulable phosphor sheet, in accordance with a level of an incident light intensity of the emitted light and in accordance with the thus calculated correction values, each of which corresponds to one of the at least two different levels of the incident light intensities.

Furthermore, the radiation image read-out apparatus in accordance with the present invention should preferably be modified such that the light projecting means irradiates the stimulating rays onto an area of one surface of a stimulable phosphor sheet, on which a predetermined amount of energy has been stored approximately uniformly (and which has been obtained from uniform exposure to the radiation), and the light projecting means projects the light, which is emitted from the exposed area of the one surface of the stimulable phosphor sheet exposed to the stimulating rays or from an area of the other surface of the stimulable phosphor sheet corresponding to the exposed area of the one surface of the stimulable phosphor sheet when the stimulating rays are irradiated onto the exposed area of the one surface of the stimulable phosphor sheet, onto the line sensor.

In such cases, the line light source employed for the radiation image readout from the stimulable phosphor sheet, on which the radiation image has been stored, is capable of being utilized for the projection of the light onto the line sensor for the calculation of the correction value. Also, in such cases, nonuniformity of the light guiding optical system and nonuniformity of the stimulation optical system are capable of being compensated for.

Also, the radiation image read-out apparatus in accordance with the present invention should preferably be modified such that the light projecting means irradiates stimulating rays onto an area of one surface of a uniform, anti-Stokes' type of phosphor sheet, and the light projecting means projects light, which is radiated out from the exposed area of the one surface of the anti-Stokes' type of the phosphor sheet exposed to the stimulating rays or from an area of the other surface of the anti-Stokes' type of the phosphor sheet corresponding to the exposed area of the one surface of the anti-Stokes' type of the phosphor sheet when the stimulating rays are irradiated onto the exposed area of the one surface of the anti-Stokes' type of the phosphor sheet, onto the line sensor.

In such cases, an operation for exposing the phosphor sheet to light need not be performed before the stimulating rays are irradiated to the phosphor sheet for the calculation of the correction value.

Further, the radiation image read-out apparatus in accordance with the present invention should preferably be modified such that the light projecting means projects light, which is produced by a reference light source, onto the line sensor. In such cases, the stimulable phosphor sheet obtained from uniform exposure to the radiation or the anti-Stokes' type of the phosphor sheet need not be prepared for the calculation of the correction value.

The reference light source should preferably be constituted of one of an EL device, a LED array, and a LD array.

With the radiation image read-out method and apparatus in accordance with the present invention, the outputs of the pixel regions of the line sensor are corrected in accordance with variation in sensitivity among the plurality of the pixel regions of the line sensor. Therefore, noise due to variation in sensitivity among the photoelectric conversion devices constituting the pixel regions of the line sensor is capable of being eliminated, and an image having good image quality is capable of being obtained.

With the radiation image read-out method and apparatus in accordance with the present invention, wherein the stimulable phosphor sheet contains the phosphor for energy storage described above, the image quality of the obtained image is capable of being enhanced even further.

With the radiation image read-out method and apparatus in accordance with the present invention, the correction values, each of which corresponds to one of at least two different levels of incident light intensities upon each of the pixel regions of the line sensor, may be calculated. Also, the output of each of the pixel regions of the line sensor, which output is obtained when each of the pixel regions of the line sensor receives the light emitted by the stimulable phosphor sheet, may be corrected in accordance with the level of the incident light intensity of the emitted light and in accordance with the thus calculated correction values, each of which corresponds to one of the at least two different levels of the incident light intensities. In such cases, a more accurate correction is capable of being performed.

DESCRIPTION OF THE PREFERRED EMBODIMENTS

The present invention will hereinbelow be described in further detail with reference to the accompanying drawings.

Figure 1:
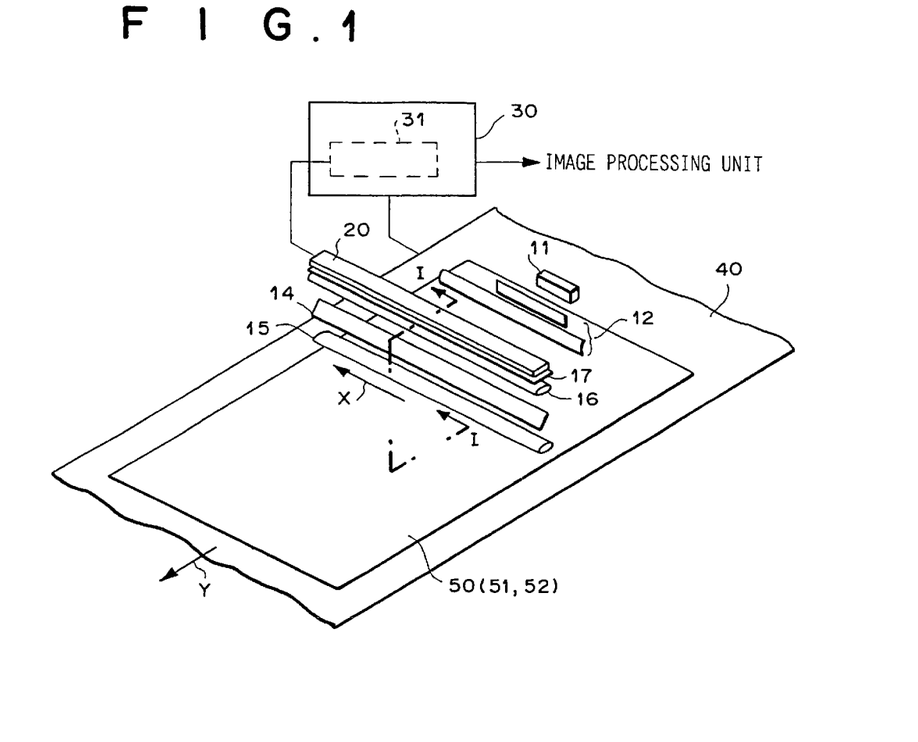
FIG. 1 is a perspective view showing a first embodiment (and a second embodiment) of the radiation image read-out apparatus in accordance with the present invention.
Figure 2:
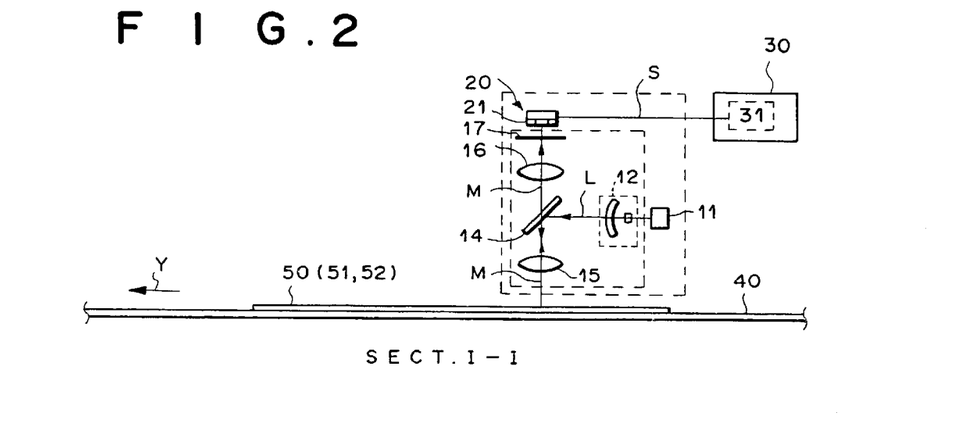
FIG. 2 is a sectional view taken on line I—I of FIG. 1.

FIG. 1 is a perspective view showing a first embodiment of the radiation image read-out apparatus in accordance with the present invention. FIG. 2 is a sectional view taken on line I—I of FIG. 1.

With reference to FIG. 1, the radiation image read-out apparatus comprises a scanning belt 40 for supporting a stimulable phosphor sheet (hereinbelow referred to simply as the sheet) 50, on which a radiation image has been stored, or a stimulable phosphor sheet (hereinbelow referred to simply as the sheet) 51, which has been obtained from uniform exposure to radiation and which is utilized for calculation of correction values. The scanning belt 40 conveys the sheet 50 (or the sheet 51) in the direction indicated by the arrow Y. The radiation image read-out apparatus also comprises a broad area laser (hereinbelow referred to as the BLD) 11 for radiating out secondary stimulating rays (hereinbelow referred to simply as the stimulating rays) L having a linear pattern. The stimulating rays L are radiated out approximately in parallel with the surface of the sheet 50 (or the sheet 51). The radiation image read-out apparatus further comprises an optical system 12, which is constituted of a combination of a collimator lens for collimating the linear stimulating rays L having been radiated out of the BLD 11 and a toric lens for expanding the beam only in one direction. The radiation image read-out apparatus still further comprises a dichroic mirror 14, which is located at an angle of 45 degrees with respect to the surface of the sheet 50 (or the sheet 51) and which is set so as to reflect the stimulating rays L and to transmit emitted light M described later. The radiation image read-out apparatus also comprises a distributed index lens array (constituted of an array of a plurality of distributed index lenses and hereinbelow referred to as the first SELFOC lens array) 15. The first SELFOC lens array 15 converges the linear stimulating rays L, which have been reflected from the dichroic mirror 14, into a linear beam (having a line width of approximately 100 μm) extending along the direction indicated by the arrow X on the sheet 50 (or the sheet 51). Also, the first SELFOC lens array 15 collimates the light M, which is emitted by the sheet 50 (or the sheet 51) exposed to the linear stimulating rays L. The radiation image read-out apparatus further comprises a second SELFOC lens array 16 for converging the emitted light M, which has been collimated by the first SELFOC lens array 15 and has then passed through the dichroic mirror 14, onto light receiving surfaces of photoelectric conversion devices 21, 21, . . . constituting a line sensor 20, which will be described later. The radiation image read-out apparatus still further comprises a stimulating ray cut-off filter 17 for transmitting only the emitted light M and filtering out the stimulating rays L, which have been reflected from the surface of the sheet 50 (or the sheet 51) and which are mixed slightly in the emitted light M having passed through the second SELFOC lens array 16. The radiation image read-out apparatus also comprises the line sensor 20 for receiving the emitted light M having passed through the stimulating ray cut-off filter 17 and for photoelectrically converting the emitted light M. The radiation image read-out apparatus further comprises image information reading means 30. The image information reading means 30 is provided with correcting operation processing means 31 for performing operation processing for correction of outputs of the photoelectric conversion devices 21, 21, . . . constituting the line sensor 20. The correcting operation processing means 31 stores the outputs of the photoelectric conversion devices 21, 21, . . . constituting the line sensor 20, which outputs have been obtained when an image read-out operation is performed on the sheet 51 having been uniformly exposed to the radiation. The correcting operation processing means 31 also calculates the correction values corresponding to the respective photoelectric conversion devices 21, 21, . . . constituting the line sensor 20. In accordance with the calculated correction values, the correcting operation processing means 31 performs the correcting operation processing on the outputs of the photoelectric conversion devices 21, 21, constituting the line sensor 20, which outputs have been obtained when an image read-out operation is performed on the sheet 50. The image information reading means 30 feeds out the outputs of the photoelectric conversion devices 21, 21, . . . , which outputs have been corrected by the correcting operation processing means 31, as an image signal into an image processing unit, such that it may be clear which output corresponds to which site on the sheet 50.

The first SELFOC lens array 15 acts such that an image of the emission area of the emitted light M on the sheet 50 is formed in one-to-one size relationship on the image surface at the dichroic mirror 14. The second SELFOC lens array 16 acts such that an image of the emitted light M on the dichroic mirror 14 is formed in one-to-one size relationship on the image surface at the light receiving surface of the line sensor 20.

The optical system 12, which is constituted of the collimator lens and the toric lens, expands the stimulating rays L, which come from the BLD 11, into a desired irradiation area on the dichroic mirror 14.

How the first embodiment of the radiation image read-out apparatus in accordance with the present invention operates will be described hereinbelow.

Firstly, the correction values for correction of the outputs of the photoelectric conversion devices 21, 21, . . . constituting the line sensor 20 are calculated in the manner described below. Specifically, a stimulable phosphor sheet 51a, which has been uniformly exposed to radiation (with an exposure amount A) and carries uniform radiation image information stored thereon, is set on the scanning belt 40. The scanning belt 40 is moved in the direction indicated by the arrow Y, and the information storing region of the sheet 51a is set at a readable region of the line sensor 20.

Also, the BLD 11 radiates out the stimulating rays L having a linear pattern with a line width of approximately 100 μm. The stimulating rays L are radiated out approximately in parallel with the surface of the sheet 51a. The stimulating rays L are collimated by the optical system 12, which is constituted of the collimator lens and the toric lens and is located in the optical path of the stimulating rays L. The collimated stimulating rays L are reflected from the dichroic mirror 14 to the direction that impinges perpendicularly upon the surface of the sheet 51a. The reflected stimulating rays L are converged by the first SELFOC lens array 15 into a linear beam extending along the direction indicated by the arrow X on the sheet 51a.

When the sheet 51a is exposed to and stimulated by the linear stimulating rays L, light Ma having an intensity in accordance with the radiation image information stored on the sheet 51a is emitted from the exposed area of the sheet 51a. In this case, the sheet 51a carries uniform radiation image information, and therefore the emitted light Ma has uniform intensity. The emitted light Ma is collimated by the first SELFOC lens array 15, passes through the dichroic mirror 14, and is converged by the second SELFOC lens array 16 onto the photoelectric conversion devices 21, 21, . . . constituting the line sensor 20. At this time, the stimulating rays L, which have been reflected from the surface of the sheet 51a and are mixed slightly in the emitted light Ma having passed through the second SELFOC lens array 16, are filtered out by the stimulating ray cut-off filter 17.

As described above, the sheet 51a is the one which has been obtained from uniform exposure to the radiation and carries uniform radiation image information. Therefore, when the sheet 51a is exposed to the stimulating rays L, the sheet 51a emits the light Ma having uniform intensity. If the photoelectric conversion devices 21, 21, . . . constituting the line sensor 20 has uniform sensitivity, when the photoelectric conversion devices 21, 21, . . . receive the emitted light Ma having uniform intensity, the electric charge signal components having an identical intensity will be obtained from the photoelectric conversion devices 21, 21, . . . . However, there is variation in sensitivity among respective photoelectric conversion devices 21-1, 21-2, 21-3, 21-4, . . . constituting the line sensor 20. Therefore, as shown in Table 1 below, outputs Qa, Qa, . . . are obtained from the photoelectric conversion devices 21-1, 21-2, 21-3, 21-4, . . . constituting the line sensor 20. The outputs Qa, Qa, . . . are fed into the correcting operation processing means 31.

TABLE 1

| Photoelectric conversion device | Output Qa | Correction value Ha | Output Qb | Correction Value Hb | Correction Value Hc |
|---|---|---|---|---|---|
| 21-1 | 3.0 | 1.0 | 1.0 | 1.0 | 1.0 |
| 21-2 | 3.3 | 0.91 | 1.0 | 1.0 | 0.955 |
| 21-3 | 3.6 | 0.83 | 1.0 | 1.0 | 0.915 |
| 21-4 | 3.6 | 0.83 | 1.2 | 0.83 | 0.83 |
| : | : | : | : | : | : |
| : | : | : | : | : | : |

Thereafter, in the same manner as that described above, a sheet 51b, which has been uniformly exposed to radiation (with an exposure amount B), is set at the readable region of the line sensor 20. The sheet 51b is stimulated by the stimulating rays L, and outputs Qb, Qb, . . . of the photoelectric conversion devices 21-1, 21-2, 21-3, 21-4, . . . constituting the line sensor 20 are obtained. The outputs Qb, Qb, . . . are fed into the correcting operation processing means 31, such that it may be clear which output Qb corresponds to which photoelectric conversion device constituting the line sensor 20.

As shown in Table 1 above, with respect to the sheet 51a having been obtained from uniform exposure to the radiation with the exposure amount A, the outputs Qa, Qa, . . . obtained from the photoelectric conversion devices 21-1, 21-2, 21-3, 21-4, . . . are respectively 3.0, 3.3, 3.6, 3.6, . . . and thus vary due to a difference in sensitivity. (As an aid in facilitating the explanation, the outputs Qa, Qa, . . . obtained from the photoelectric conversion devices 21-1, 21-2, 21-3, and 21-4 are taken as an example.) The correcting operation processing means 31 takes the photoelectric conversion device 21-1 as a reference photoelectric conversion device and calculates correction values Ha, Ha, . . . for the photoelectric conversion devices 21-1, 21-2, 21-3, 21-4, . . . with respect to the sheet 51a having been obtained from uniform exposure to the radiation with the exposure amount A. The calculations are made with Formula (1) shown below.

$$Hj(i) = K(i)/Qj(i) \tag{1}$$

wherein H represents the correction value, i represents a or b, j represents 1, 2, 3, 4, . . . , and K represents the output obtained from the reference photoelectric conversion device.

As found from Table 1 above, with respect to the sheet 51a, the outputs Qa, Qa, . . . obtained from the photoelectric conversion devices 21-1, 21-2, 21-3, and 21-4 are respectively 3.0, 3.3, 3.6, and 3.6. Therefore, the correction values Ha, Ha, . . . for the photoelectric conversion devices 21-1, 21-2, 21-3, and 21-4, which correction values have been obtained with respect to the reference photoelectric conversion device 21-1, are respectively 1.0, 0.91, 0.83, and 0.83.

Also, with respect to the sheet 51b, the outputs Qb, Qb, . . . obtained from the photoelectric conversion devices 21-1, 21-2, 21-3, and 21-4 are respectively 1.0, 1.0, 1.0, and 1.2. Therefore, correction values Hb, Hb, . . . for the photoelectric conversion devices 21-1, 21-2, 21-3, and 21-4, which correction values have been obtained with respect to the reference photoelectric conversion device 21-1, are respectively 1.0, 1.0, 1.0, and 0.83.

In the manner described above, the correcting operation processing means 31 performs the operation processing on the outputs, which have been obtained from the photoelectric conversion devices 21, 21, . . . , and obtains the correction values Ha, Ha, . . . with respect to the sheet 51a and the correction values Hb, Hb, . . . with respect to the sheet 51b. The correcting operation processing means 31 stores the information representing the correction values Ha, Ha, . . . and the correction values Hb, Hb, . . . in an internal memory. When the image read-out operation is later performed on the sheet 50, on which the radiation image has been stored, the correction values Ha, Ha, . . . and the correction values Hb, Hb, . . . are utilized for correcting the outputs of the photoelectric conversion devices 21, 21, . . . .

In this embodiment, as described above, the sheet 51a and the sheet 51b, which have been uniformly exposed to the radiation with different exposure amounts, are utilized, and incident light intensities Ta and Tb (in this case, the intensities of the light emitted by the sheet 51a and the sheet 51b) impinging upon the line sensor 20 are thereby adjusted. In this manner, the correction values Ha, Ha, . . . and the correction values Hb, Hb, . . . corresponding to different incident light intensities Ta and Tb are calculated. Alternatively, one of other techniques may be employed for obtaining the different incident light intensities Ta and Tb impinging upon the line sensor 20. For example, the incident light intensity impinging upon the line sensor 20 may be adjusted by performing stimulation with the stimulating rays L having different intensities, or by performing stimulation with the stimulating rays L having identical intensity for different lengths of time.

Thereafter, the image read-out operation is performed on the sheet 50, on which the radiation image has been stored. Specifically, firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into the image information reading means 30.

The BLD 11 radiates out the stimulating rays L having a linear pattern. The stimulating rays L are radiated out approximately in parallel with the surface of the sheet 50. The stimulating rays L are collimated by the optical system 12, which is constituted of the collimator lens and the toric lens and is located in the optical path of the stimulating rays L. The collimated stimulating rays L are reflected from the dichroic mirror 14 to the direction that impinges perpendicularly upon the surface of the sheet 50. The reflected stimulating rays L are converged by the first SELFOC lens array 15 into a linear beam (having a line width $d_L$ of approximately 100 $\mu$m) extending along the direction indicated by the arrow X on the sheet 50.

When the sheet 50 is exposed to and stimulated by the linear stimulating rays L, light Mc having an intensity in accordance with the image information stored on the sheet 50 is emitted from the exposed area of the sheet 50. The emitted light Mc is collimaed by the first SELFOC lens array 15, passes through the dichroic mirror 14, and is converged by the second SELFOC lens array 16 onto the photoelectric conversion devices 21, 21, constituting the line sensor 20. At this time, the stimulating rays L, which have been reflected from the surface of the sheet 50 and are mixed slightly in the emitted light Mc having passed through the second SELFOC lens array 16, are filtered out by the stimulating ray cut-off filter 17.

The line sensor 20 photoelectrically converts the emitted light Mc, which has been received by each of the photoelectric conversion devices 21, 21, . . . , and obtains signal components Qc, Qc, . . . from the photoelectric conversion. The signal components Qc, Qc, . . . are fed into the correcting operation processing means 31. In accordance with the correction value Ha and the correction value Hb, which have been calculated previously with respect to each of the photoelectric conversion devices 21, 21, . . . , the correcting operation processing means 31 calculates a correction value Hc with respect to the signal component Qc, which has been obtained from the photoelectric conversion device 21. In this manner, correction values Hc, Hc, . . . are calculated with respect to the signal components Qc, Qc, . . . , which have been obtained from the photoelectric conversion devices 21, 21, . . . . Also, the correcting operation processing means 31 performs the correcting operation processing by utilizing the thus obtained correction values Hc, Hc, . . . in order to obtain corrected signal components. The image information reading means 30 stores the corrected signal components, which have been obtained from the correcting operation processing means 31, in accordance with the movement speed of the scanning belt 40, such that it may be clear which corrected signal component corresponds to which site on the sheet 50. Thereafter, the image information reading means 30 feeds the corrected signal components as an image signal into the image processing unit.

The calculation of the correction value Hc with respect to the output signal component Qc having been obtained from each photoelectric conversion device 21 may be made in one of various ways. For example, as the correction value Hc with respect to the output signal component Qc having been obtained from each photoelectric conversion device 21, the mean value of the correction value Ha and the correction value Hb, which correspond respectively to the incident light intensities Ta and Tb and have been calculated with respect to each photoelectric conversion device 21, maybe calculated. In such cases, a difference between the incident light intensities Ta and Tb should preferably be as large as possible.

Table 1 shown above also lists the correction values Hc, Hc, . . . corresponding to the respective photoelectric conversion devices 21, 21, . . . , each of which correction values has been calculated as the mean value of the correction value Ha and the correction value Hb corresponding respectively to the incident light intensities Ta and Tb and having been calculated with respect to each photoelectric conversion device 21. In accordance with the correction value Hc corresponding to each photoelectric conversion device 21, the correcting operation processing means 31 performs the correcting operation processing on the output obtained from the photoelectric conversion device 21. The correcting operation processing is performed with Formula (2) shown below, and a corrected signal component Qc' is thereby obtained.

$$Qc'(j)=Qc(j)\times Hc(j) \tag{2}$$

In the manner described above, with the first embodiment of the radiation image read-out apparatus in accordance with the present invention, the signal components Qc, Qc, . . . having been obtained from the line sensor 20 are corrected in accordance with variation in sensitivity among the photoelectric conversion devices 21, 21, . . . constituting the line sensor 20. Therefore, the image quality of the obtained image is capable of being prevented from becoming bad due to the variation in sensitivity among the photoelectric conversion devices 21, 21, . . . . Also, the correction value Hc with respect to the output of each photoelectric conversion device 21, which output is obtained from the image read-out operation performed on the sheet 50 carrying the radiation image stored thereon, is calculated in accordance with the correction value Ha and the correction value Hb, which have been calculated with respect to two different incident light intensities Ta and Tb impinging upon the line sensor 20. Therefore, more accurate correction effects are capable of being obtained. As a result, an image having good image quality is capable of being obtained.

In the first embodiment described above in order for the correction values Ha, Ha, . . . and the correction values Hb, Hb, . . . to be obtained, the sheet 51$a$ and the sheet 51$b$, which have been obtained from uniform exposure to the radiation with different exposure amounts A and B, are utilized, and the light emitted by each of the sheet 51$a$ and the sheet 51$b$ is projected onto the line sensor 20. Alternatively, as in a second embodiment described below, a uniform anti-Stokes' type of phosphor sheet 52 may be utilized in lieu of the sheet 51$a$ and the sheet 51$b$, and light radiated out from the anti-Stokes' type of the phosphor sheet 52 may be projected onto the line sensor 20. In such cases, the adjustment of the incident light intensity upon the line sensor 20 may be made by adjusting the intensity of the stimulating rays L or the stimulation time.

The second embodiment of the radiation image read-out apparatus in accordance with the present invention will be described hereinbelow with reference to FIG. 1.

In the second embodiment, as illustrated in FIG. 1, the radiation image read-out apparatus comprises the scanning belt 40 for supporting the stimulable phosphor sheet (hereinbelow referred to simply as the sheet) 50, on which the radiation image has been stored, or the uniform anti-Stokes' type of the phosphor sheet (hereinbelow referred to simply as the sheet) 52, which is utilized for the calculation of correction values. The scanning belt 40 conveys the sheet 50 (or the sheet 52) in the direction indicated by the arrow Y. The radiation image read-out apparatus also comprises the broad area laser (hereinbelow referred to as the BLD) 11 for radiating out the stimulating rays L having a linear pattern. The stimulating rays L are radiated out approximately in parallel with the surface of the sheet 50 (or the sheet 52). The radiation image read-out apparatus further comprises the optical system 12, which is constituted of a combination of a collimator lens for collimating the linear stimulating rays L having been radiated out of the BLD 11 and a toric lens for expanding the beam only in one direction. The radiation image read-out apparatus still further comprises the dichroic mirror 14, which is located at an angle of 45 degrees with respect to the surface of the sheet 50 (or the sheet 52). The dichroic mirror 14 is set so as to reflect the stimulating rays L and to transmit the light M, which is emitted by the sheet 50, and radiated-out light N, which is radiated out from the sheet 52 as will be described later. The radiation image read-out apparatus also comprises the distributed index lens array (constituted of an array of a plurality of distributed index lenses and hereinbelow referred to as the first SELFOC lens array) 15.

The first SELFOC lens array 15 converges the linear stimulating rays L, which have been reflected from the dichroic mirror 14, into a linear beam (having a line width of approximately 100 μm) extending along the direction indicated by the arrow X on the sheet 50 (or the sheet 52). Also, the first SELFOC lens array 15 collimates the light M, which is emitted by the sheet 50 exposed to the linear stimulating rays L, or the radiated-out light N, which is radiated out from the sheet 52. The radiation image read-out apparatus further comprises the second SELFOC lens array 16 for converging the emitted light M or the radiated-out light N, which has been collimated by the first SELFOC lens array 15 and has then passed through the dichroic mirror 14, onto the light receiving surfaces of the photoelectric conversion devices 21, 21, . . . constituting the line sensor 20. The radiation image read-out apparatus still further comprises the stimulating ray cut-off filter 17 for transmitting only the emitted light M or the radiated-out light N and filtering out the stimulating rays L, which have been reflected from the surface of the sheet 50 (or the sheet 52) and which are mixed slightly in the emitted light M or the radiated-out light N having passed through the second SELFOC lens array 16. The radiation image read-out apparatus also comprises the line sensor 20 for receiving the emitted light M or the radiated-out light N having passed through the stimulating ray cut-off filter 17 and for photoelectrically converting the emitted light M or the radiated-out light N. The radiation image read-out apparatus further comprises the image information reading means 30. The image information reading means 30 is provided with the correcting operation processing means 31 for performing the operation processing for the correction of the outputs of the photoelectric conversion devices 21, 21, . . . constituting the line sensor 20. The correcting operation processing means 31 stores the outputs of the photoelectric conversion devices 21, 21, . . . constituting the line sensor 20, which outputs have been obtained when the radiated-out light N having been radiated out from the anti-Stokes' type of the sheet 52 is received. The correcting operation processing means 31 also calculates the correction values corresponding to the respective photoelectric conversion devices 21, 21, . . . constituting the line sensor 20. In accordance with the calculated correction values, the correcting operation processing means 31 performs the correcting operation processing on the outputs of the photoelectric conversion devices 21, 21, . . . constituting the line sensor 20, which outputs have been obtained when an image read-out operation is performed on the sheet 50. The image information reading means 30 feeds out the outputs of the photoelectric conversion devices 21, 21, . . . , which outputs have been corrected by the correcting operation processing means 31, as an image signal into an image processing unit, such that it may be clear which output corresponds to which site on the sheet 50.

The first SELFOC lens array 15 acts such that an image of the emission area of the emitted light M on the sheet 50 or an image of the emission area of the radiated-out light N on the sheet 52 is formed in one-to-one size relationship on the image surface at the dichroic mirror 14. The second SELFOC lens array 16 acts such that an image of the emitted light M or the radiated-out light N on the dichroic mirror 14 is formed in one-to-one size relationship on the image surface at the light receiving surface of the line sensor 20.

The optical system 12, which is constituted of the collimator lens and the toric lens, expands the stimulating rays L, which come from the BLD 11, into a desired irradiation area on the dichroic mirror 14.

How the second embodiment of the radiation image read-out apparatus in accordance with the present invention operates will be described hereinbelow.

Firstly, the correction values for correction of the outputs of the photoelectric conversion devices 21, 21, . . . constituting the line sensor 20 are calculated in the manner described below. Specifically, the uniform anti-Stokes' type of the phosphor sheet 52 is set on the scanning belt 40. The scanning belt 40 is moved in the direction indicated by the arrow Y, and the sheet 52 is set at the readable region of the line sensor 20.

Also, the BLD 11 radiates out the stimulating rays L having a linear pattern with a line width of approximately 100 μm. The stimulating rays L are radiated out approximately in parallel with the surface of the sheet 52. The stimulating rays L are collimated by the optical system 12, which is constituted of the collimator lens and the toric lens and is located in the optical path of the stimulating rays L. The collimated stimulating rays L are reflected from the dichroic mirror 14 to the direction that impinges perpendicularly upon the surface of the sheet 52. The reflected stimulating rays L are converged by the first SELFOC lens array 15 into a linear beam extending along the direction indicated by the arrow X on the sheet 52.

When the sheet 52 is exposed to and stimulated by the linear stimulating rays L, the radiated-out light N having wavelengths falling within a wavelength region different from the wavelength region of the stimulating rays L is radiated out from the exposed area of the sheet 52. In this case, the sheet 52 is the uniform anti-Stokes' type of the phosphor sheet, and therefore the radiated-out light N has uniform intensity. The radiated-out light N is collimated by the first SELFOC lens array 15, passes through the dichroic mirror 14, and is converged by the second SELFOC lens array 16 onto the photoelectric conversion devices 21, 21, . . . constituting the line sensor 20. At this time, the stimulating rays L, which have been reflected from the surface of the sheet 52 and are mixed slightly in the radiated-out light N having passed through the second SELFOC lens array 16, are filtered out by the stimulating ray cut-off filter 17.

As described above, the sheet 52 is the uniform anti-Stokes' type of the phosphor sheet. Therefore, when the sheet 52 is exposed to the stimulating rays L, the sheet 52 radiates out the light N having uniform intensity. If the photoelectric conversion devices 21, 21, . . . constituting the line sensor 20 has uniform sensitivity, when the photoelectric conversion devices 21, 21, . . . receive the radiated-out light N having uniform intensity, the electric charge signal components having an identical intensity will be obtained from the photoelectric conversion devices 21, 21, . . . . However, there is variation in sensitivity among the respective photoelectric conversion devices 21-1, 21-2, 21-3, 21-4, . . . constituting the line sensor 20. Therefore, outputs Qa', Qa', . . . having different values in accordance with a difference in sensitivity are obtained from the photoelectric conversion devices 21-1, 21-2, 21-3, 21-4, . . . constituting the line sensor 20. The outputs Qa', Qa', . . . are fed into the correcting operation processing means 31.

Thereafter, the intensity of the stimulating rays L is altered or the stimulation time is altered, and the operation is performed on the sheet 52 in the same manner as that described above. In this manner, outputs Qb', Qb', . . . of the photoelectric conversion devices 21-1, 21-2, 21-3, 21-4, . . . constituting the line sensor 20 are obtained. The outputs Qb', Qb', . . . are fed into the correcting operation processing means 31, such that it may be clear which output Qb' corresponds to which photoelectric conversion device constituting the line sensor 20.

Thereafter, in accordance with the outputs Qa', Qa', . . . and the outputs Qb', Qb', . . . , correction values Ha', Ha', . . . and correction values Hb', Hb', . . . are calculated. The calculations of the correction values Ha', Ha', . . . and the correction values Hb', Hb', . . . in accordance with the outputs Qa', Qa', . . . and the outputs Qb', Qb', . . . are performed in the same manner as that in the calculations of the correction values Ha, Ha, . . . and the correction values Hb, Hb, . . . in accordance with the outputs Qa, Qa, . . . and the outputs Qb, Qb, . . . in the first embodiment described above. Also, the output signal component Qc, which has been obtained from each photoelectric conversion device 21 in the image read-out operation performed on the sheet 50, is corrected with a correction value Hc' in the same manner as that in the correction with the correction value Hc in the first embodiment described above.

In the manner described above, with the second embodiment of the radiation image read-out apparatus in accordance with the present invention, the signal components Qc, Qc, . . . which have been obtained from the line sensor 20 in the image read-out operation performed on the sheet 50 carrying the radiation image stored thereon, are corrected in accordance with variation in sensitivity among the photoelectric conversion devices 21, 21, . . . constituting the line sensor 20. Therefore, the image quality of the obtained image is capable of being prevented from becoming bad due to the variation in sensitivity among the photoelectric conversion devices 21, 21, . . . . Also, the correction value Hc' with respect to the output of each photoelectric conversion device 21, which output is obtained from the image read-out operation performed on the sheet 50 carrying the radiation image stored thereon, is calculated in accordance with the correction value Ha' and the correction value Hb', which have been calculated with respect to two different incident light intensities impinging upon the line sensor 20. Therefore, more accurate correction effects are capable of being obtained. As a result, an image having good image quality is capable of being obtained.

Figure 3:
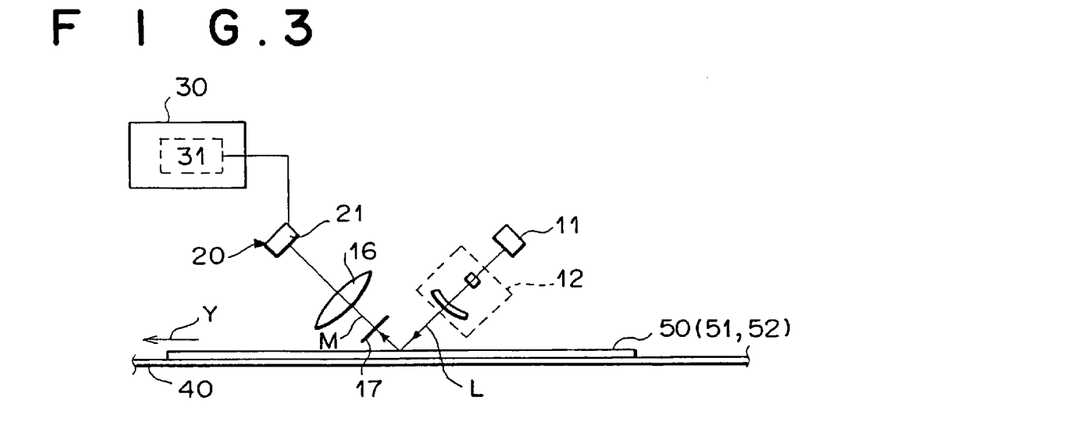
FIG. 3 is a sectional view showing a third embodiment (and a fourth embodiment) of the radiation image read-out apparatus in accordance with the present invention.

In the aforesaid first and second embodiments of the radiation image read-out apparatus in accordance with the present invention, part of the optical path of the stimulating rays L and part of the optical path of the emitted light M or the radiated-out light N, which is radiated out from the anti-Stokes' type of the phosphor sheet 52, overlap each other, and the size of the apparatus is thereby reduced. Alternatively, for example, as illustrated in FIG. 3, the radiation image read-out apparatus in accordance with the present invention may be constituted such that the optical path of the stimulating rays L and the optical path of the emitted light M or the radiated-out light N may not overlap each other. Third and fourth embodiments of the radiation image read-out apparatus in accordance with the present invention, which are constituted in such a manner, will be described hereinbelow with reference to FIG. 3.

Specifically, the radiation image read-out apparatus illustrated in FIG. 3 comprises the scanning belt 40 and the BLD 11 for radiating out the linear stimulating rays L at an angle of approximately 45 degrees with respect to the surface of the sheet 50 (or the sheet 51, or the sheet 52). The radiation image read-out apparatus also comprises the optical system 12, which is constituted of a combination of a collimator lens for collimating the linear stimulating rays L having been radiated out of the BLD 11 and a toric lens for expanding the beam only in one direction, and which causes the linear stimulating rays L to impinge upon the surface of the sheet 50 (or the sheet 51, or the sheet 52). The radiation image read-out apparatus further comprises the SELFOC lens array 16 having an optical axis, which is inclined at an angle of approximately 45 degrees with respect to the surface of the sheet 50 (or the sheet 51, or the sheet 52) and which is approximately normal to the direction of travel of the stimulating rays L. The SELFOC lens array 16 converges the light M, which is emitted by the sheet 50 (or the sheet 51) when the sheet 50 (or the sheet 51) is exposed to the stimulating rays L, or the radiated-out light N, which is radiated out from the sheet 52 when the sheet 52 is exposed to the stimulating rays L, onto the light receiving surfaces of the photoelectric conversion devices 21, 21, . . . constituting the line sensor 20. The radiation image read-out apparatus still further comprises the stimulating ray cut-off filter 17 for transmitting only the emitted light M or the radiated-out light N and filtering out the stimulating rays L, which are mixed slightly in the emitted light M or the radiated-out light N impinging upon the SELFOC lens array 16. The radiation image read-out apparatus also comprises the line sensor 20 for receiving the emitted light M or the radiated-out light N having passed through the stimulating ray cut-off filter 17 and for photoelectrically converting the emitted light M or the radiated-out light N. The radiation image read-out apparatus further comprises the image information reading means 30. The image information reading means 30 is provided with the correcting operation processing means 31 for performing the operation processing for the correction of the outputs of the photoelectric conversion devices 21, 21, . . . constituting the line sensor 20. The correcting operation processing means 31 stores the outputs of the photoelectric conversion devices 21, 21, . . . constituting the line sensor 20, which outputs have been obtained when an image read-out operation is performed on the sheet 51 having been uniformly exposed to the radiation, or the outputs of the photoelectric conversion devices 21, 21, . . . constituting the line sensor 20, which outputs have been obtained when the radiated-out light N having been radiated out from the anti-Stokes' type of the sheet 52 is received. The correcting operation processing means 31 also calculates the correction values corresponding to the respective photoelectric conversion devices 21, 21, . . . constituting the line sensor 20. In accordance with the calculated correction values, the correcting operation processing means 31 performs the correcting operation processing on the outputs of the photoelectric conversion devices 21, 21, . . . constituting the line sensor 20, which outputs have been obtained when an image read-out operation is performed on the sheet 50. The image information reading means 30 feeds out the outputs of the photoelectric conversion devices 21, 21, . . . , which outputs have been corrected by the correcting operation processing means 31, as an image signal into an image processing unit, such that it may be clear which output corresponds to which site on the sheet 50.

In the third embodiment, in which the sheet 51 having been obtained from uniform exposure to the radiation is utilized, and in the fourth embodiment, in which the uniform anti-Stokes' type of the phosphor sheet 52 is utilized, the operations are performed in the same manner as that in the first and second embodiments described above.

In the manner described above, with each of the third and fourth embodiments of the radiation image read-out apparatus in accordance with the present invention, the signal components Qc, Qc, . . . , which have been obtained from the line sensor 20 in the image read-out operation performed on the sheet 50 carrying the radiation image stored thereon, are corrected in accordance with variation in sensitivity among the photoelectric conversion devices 21, 21, . . . constituting the line sensor 20. Therefore, the image quality of the obtained image is capable of being prevented from becoming bad due to the variation in sensitivity among the photoelectric conversion devices 21, 21, . . . . Also, the correction value with respect to the output of each photoelectric conversion device 21, which output is obtained from the image read-out operation performed on the sheet 50 carrying the radiation image stored thereon, is calculated in accordance with the correction values, which have been calculated with respect to two different incident light intensities impinging upon the line sensor 20. Therefore, more accurate correction effects are capable of being obtained. As a result, an image having good image quality is capable of being obtained.

Figure 4:
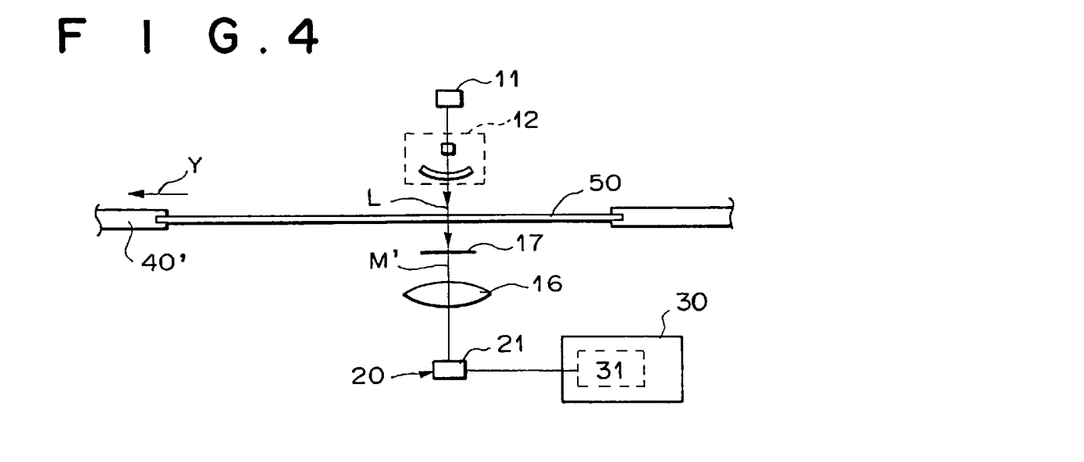
FIG. 4 is a sectional view showing a fifth embodiment of the radiation image read-out apparatus in accordance with the present invention.

In the aforesaid embodiments of the radiation image read-out apparatus in accordance with the present invention, the BLD 11 for producing the stimulating rays L and the line sensor 20 are located on the same surface side of the sheet 50, and the emitted light M emanating from the surface of the sheet 50, upon which the stimulating rays L impinge, is received by the line sensor 20. Thus the constitutions are the reflection types of constitutions. However, the radiation image read-out apparatus in accordance with the present invention is not limited to the reflection types of constitutions. For example, as illustrated in FIG. 4, a stimulable phosphor sheet 50' whose substrate is formed from a material permeable to the emitted light M may be employed, and the BLD 11 for producing the stimulating rays L and the line sensor 20 may be located on opposite surface sides of the sheet 50'. In this manner, the emitted light M emanating from the surface opposite to the surface of the sheet 50', upon which the stimulating rays L impinge, may be received by the line sensor 20. Thus the constitution may be the transmission type of constitution. A fifth embodiment of the radiation image read-out apparatus in accordance with the present invention, which is constituted in such a manner, will be described hereinbelow with reference to FIG. 4.

Specifically, the radiation image read-out apparatus illustrated in FIG. 4 comprises a conveyor belt 40' for supporting the leading end portion and the tail end portion of the stimulable phosphor sheet 50' and conveying the sheet 50' in the direction indicated by the arrow Y. (No image information is stored at the leading end portion and the tail end portion of the sheet 50', or image information representing a region other than a region of interest in the radiation image is stored at the leading end portion and the tail end portion of the sheet 50'.) The radiation image read-out apparatus also comprises the BLD 11 for radiating out the linear stimulating rays L along the direction approximately normal to one surface of the sheet 50'. The radiation image read-out apparatus further comprises the optical system 12, which is constituted of a combination of a collimator lens for collimating the linear stimulating rays L having been radiated out of the BLD 11 and a toric lens for expanding the beam only in one direction, and which causes the linear stimulating rays L to impinge upon the one surface of the sheet 50'. The radiation image read-out apparatus still further comprises the SELFOC lens array 16 having an optical axis, which is approximately normal to the one surface of the sheet 50'. The SELFOC lens array 16 converges light M', which is emitted from the other surface of the sheet 50' when the sheet 50' is exposed to the stimulating rays L (i.e., the other surface opposite to the one surface on the stimulating ray incidence side), onto the light receiving surfaces of the photoelectric conversion devices 21, 21, . . . constituting the line sensor 20. The radiation image read-out apparatus also comprises the stimulating ray cut-off filter 17 for transmitting only the emitted light M' and filtering out the stimulating rays L, which are mixed slightly in the emitted light M' impinging upon the SELFOC lens array 16. The radiation image read-out apparatus further comprises the line sensor 20 for receiving the emitted light M' having passed through the stimulating ray cut-off filter 17 and for photoelectrically converting the emitted light M'. The radiation image read-out apparatus still further comprises the image information reading means 30. The image information reading means 30 is provided with the correcting operation processing means 31 for performing operation processing for the correction of the outputs of the photoelectric conversion devices 21, 21, . . . constituting the line sensor 20. The correcting operation processing means 31 stores the outputs of the photoelectric conversion devices 21, 21, . . . constituting the line sensor 20, which outputs have been obtained when light L' having been produced by a reference light source 11' is received as will be described later. The correcting operation processing means 31 also calculates the correction values corresponding to the respective photoelectric conversion devices 21, 21, . . . constituting the line sensor 20. In accordance with the calculated correction values, the correcting operation processing means 31 performs the correcting operation processing on the outputs of the photoelectric conversion devices 21, 21, . . . constituting the line sensor 20, which outputs have been obtained when an image read-out operation is performed on the sheet 50. The image information reading means 30 feeds out the outputs of the photoelectric conversion devices 21, 21, . . . , which outputs have been corrected by the correcting operation processing means 31, as an image signal into an image processing unit, such that it may be clear which output corresponds to which site on the sheet 50.

The SELFOC lens array 16 acts such that an image of the emission area of the emitted light M' on the other surface of the sheet 50' is formed in one-to-one size relationship on the image surface at the light receiving surface of the line sensor 20. The optical system 12, which is constituted of the collimator lens and the toric lens, expands the stimulating rays L, which come from the BLD 11, into a desired irradiation area on the sheet 50'.

How the fifth embodiment of the radiation image read-out apparatus in accordance with the present invention, which is shown in FIG. 4, operates will be described hereinbelow.

Figure 5:
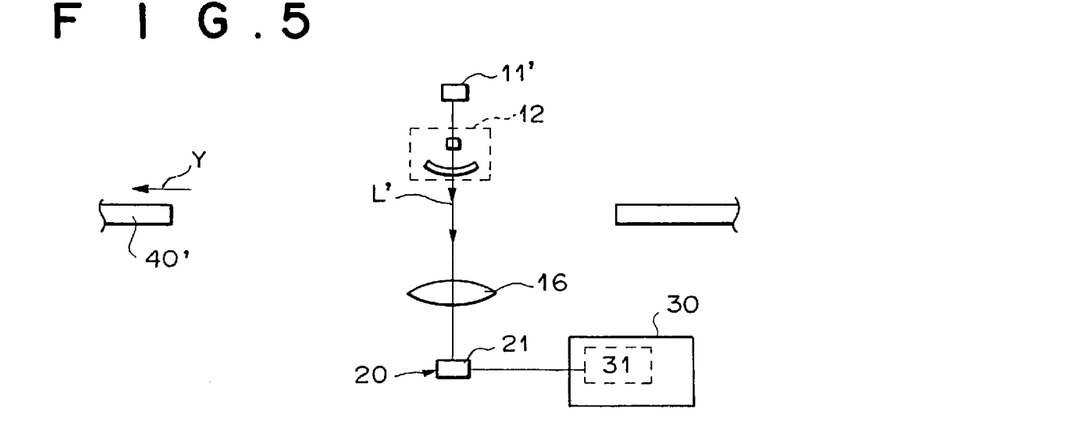
FIG. 5 is an explanatory view showing how correction values are calculated.

Firstly, as illustrated in FIG. 5, the radiation image read-out apparatus is set such that no sheet intervenes between the optical system 12 and the line sensor 20, or such that a sheet capable of transmitting the light L' produced by the reference light source 11', which may be constituted of one of an EL device, a LED array, and a LD array, intervenes between the optical system 12 and the line sensor 20. In this state, correction values with respect to the photoelectric conversion devices 21, 21, . . . constituting the line sensor 20 are calculated. Specifically, the light L' having a predetermined intensity is produced by the reference light source 11' and is converged in a linear pattern onto the light receiving section of the line sensor 20. The operations after the light L' has been received by the line sensor 20 are the same as those in the first, second, third, and fourth embodiments described above. In such cases, such that the amount of light received by the line sensor 20 may be ensured, the stimulating ray cut-off filter 17 should preferably be removed.

In the manner described above, the intensity of the light L' irradiated from the reference light source 11' is adjusted, and the correction values for the outputs of the photoelectric conversion devices 21, 21, . . . constituting the line sensor 20 are calculated with respect to at least two different incident light intensities upon the line sensor 20.

Reverting to FIG. 4, how the radiation image is read out from the sheet 50, on which the radiation image has been stored, will be described hereinbelow.

Firstly, the conveyor belt 40' moves in the direction indicated by the arrow Y, and the sheet 50', on which the radiation image has been stored and which is supported by the conveyor belt 40', is conveyed in the direction indicated by the arrow Y. The conveyance speed of the sheet 50' is equal to the movement speed of the conveyor belt 40'. Information representing the movement speed of the conveyor belt 40' is fed into the image information reading means 30.

Also, the BLD 11 radiates out the stimulating rays L having a linear pattern with a line width of approximately 100 $\mu$m. The stimulating rays L are radiated out in the direction approximately normal to the one surface of the sheet 50'. The stimulating rays L are collimated by the optical system 12, which is constituted of the collimator lens and the toric lens and is located in the optical path of the stimulating rays L. The collimated stimulating rays L impinge upon the one surface of the sheet 50' from the direction approximately normal to the one surface of the sheet 50'. At this time, the stimulating rays L impinge upon the linear area (having a line width $d_L$ of approximately 100 $\mu$m) on the one surface of the sheet 50', which linear area extends in the direction indicated by the arrow X.

When the sheet 501 is exposed to and stimulated by the linear stimulating rays L, the light M having an intensity in accordance with the image information stored on the sheet 50' is emitted from the area containing the exposed area and the neighboring areas. At the same time, the emitted light M' having passed through the transparent substrate of the sheet 50' emanates from a linear area of the other surface of the sheet 50'.

The emitted light M', which emanates from the linear area of the other surface of the sheet 50', passes through the stimulating ray cut-off filter 17, which filters out the stimulating rays L mixed in the emitted light M'. The emitted light M' then impinges upon the SELFOC lens array 16 and is converged onto the light receiving surfaces of the photoelectric conversion devices 21, 21, . . . constituting the line sensor 20.

The operations performed after the emitted light M' is received by the line sensor 20 are the same as those in the aforesaid first, second, third, and fourth embodiments of the radiation image read-out apparatus in accordance with the present invention.

In the manner described above, with the fifth embodiment of the radiation image read-out apparatus in accordance with the present invention, the signal components Qc, Qc, . . . , which have been obtained from the line sensor 20 in the image read-out operation performed on the sheet 50 carrying the radiation image stored thereon, are corrected in accordance with variation in sensitivity among the photoelectric conversion devices 21, 21, . . . constituting the line sensor 20. Therefore, the image quality of the obtained image is capable of being prevented from becoming bad due to the variation in sensitivity among the photoelectric conversion devices 21, 21, . . . . Also, the correction value with respect to the output of each photoelectric conversion device 21, which output is obtained from the image read-out operation performed on the sheet 50 carrying the radiation image stored thereon, is calculated in accordance with the correction values, which have been calculated with respect to two different incident light intensities impinging upon the line sensor 20. Therefore, more accurate correction effects are capable of being obtained. As a result, an image having good image quality is capable of being obtained.

In the transmission type of the radiation image read-out apparatus shown in FIG. 4, the reference light source 11' is employed as the light projecting means for projecting light onto the line sensor 20 for the calculations of the correction values. Alternatively, as in the first, second, third, and fourth embodiments described above, the light to be projected onto the line sensor 20 for the calculations of the correction values may be obtained by stimulating the stimulable phosphor sheet 51, which has been obtained from uniform exposure to radiation, or the uniform anti-Stokes' type of the phosphor sheet 52.

In the first, second, third, and fourth embodiments described above, the light to be projected onto the line sensor 20 for the calculations of the correction values is obtained by stimulating the stimulable phosphor sheet 51, which has been obtained from uniform exposure to radiation, or the uniform anti-Stokes' type of the phosphor sheet 52. Alternatively, in the first, second, third, and fourth embodiments described above, the light to be projected onto the line sensor 20 for the calculations of the correction values may be obtained by utilizing the reference light source 11'.

Specifically, with the radiation image read-out apparatus in accordance with the present invention, the correction values, each of which corresponds to one of at least two different levels of incident light intensities upon each of the pixel regions of the line sensor 20, are calculated. Also, the output of each of the pixel regions of the line sensor 20, which output is obtained when each of the pixel regions of the line sensor receives the light emitted by the stimulable phosphor sheet 50 or 50' in the image read-out operation, is corrected in accordance with the level of the incident light intensity of the emitted light and in accordance with the thus calculated correction values, each of which corresponds to one of the at least two different levels of the incident light intensities. In this manner, noise due to variation in sensitivity among the photoelectric conversion devices 21, 21, . . . constituting the line sensor 20 is capable of being eliminated, and an image having good image quality is capable of being obtained.

Also, in the aforesaid embodiments of the radiation image read-out apparatus in accordance with the present invention, in order for the correction values to be calculated, the light having uniform light intensity distribution along the longitudinal direction of the line sensor 20 is projected onto the line sensor 20, and the correction values are calculated such that the outputs of the pixel regions of the line sensor 20 may become approximately uniform. Alternatively, light having a known light intensity distribution along the longitudinal direction of the line sensor 20, e.g. light having a light intensity distribution identical with the light intensity distribution of the stimulating rays L, may be projected onto the line sensor 20, and the correction value for each of the pixel regions of the line sensor 20 may be calculated in accordance with the output of the pixel region of the line sensor 20 and the level of the incident light intensity, which the pixel region of the line sensor 20 has received.

In the radiation image read-out apparatus in accordance with the present invention, the stimulable phosphor sheet for storing the radiation image may be an ordinary stimulable phosphor sheet comprising a stimulable phosphor for absorbing radiation and storing energy from the radiation, i.e. the radiation image.

Also, the radiation image read-out apparatus in accordance with the present invention may be employed in the radiation image recording and reproducing system proposed in, for example, Japanese Patent Application No. 11(1999)-372978. With the proposed radiation image recording and reproducing system, the radiation absorbing functions and the energy storing functions of the conventional stimulable phosphor are separated from each other, and a phosphor having good radiation absorbing characteristics and a phosphor having good light emission response characteristics are utilized respectively for radiation absorption and radiation image storage. The phosphor having good radiation absorbing characteristics (i.e., a phosphor for radiation absorption) is caused to absorb the radiation and to emit light having wavelengths falling within an ultraviolet to visible region. Also, the phosphor having good light emission response characteristics (i.e., a phosphor for energy storage) is caused to absorb the light, which has been emitted by the phosphor having good radiation absorbing characteristics, and to store energy of the emitted light. The phosphor having good light emission response characteristics, on which the energy of the emitted light has been stored, is then exposed to light having wavelengths falling within a visible to infrared region, which light causes the phosphor having good light emission response characteristics to emit light in accordance with the stored energy. The light having thus been emitted by the phosphor having good light emission response characteristics is successively detected with photoelectric read-out means, and an image signal is thereby obtained. With the proposed radiation image recording and reproducing system, the detection quantum efficiency in the formation of the radiation image, i.e., the radiation absorptivity, the light emission efficiency, the emitted light pickup efficiency, and the like, is capable of being enhanced as a whole. Therefore, in the radiation image read-out apparatus in accordance with the present invention, the stimulable phosphor sheet should preferably contain the phosphor for energy storage described above. In such cases, the image quality of the obtained image is capable of being enhanced even further.

Further, the stimulable phosphor sheet employed in the radiation image read-out apparatus in accordance with the present invention may be a stimulable phosphor sheet for energy subtraction processing, which stores two radiation images of a single object formed with radiation having different energy distributions, the stimulable phosphor sheet being capable of emitting light, which carries information of one of the two radiation images, from one surface, and emitting light, which carries information of the other radiation image, from the other surface. Also, two line sensors may be utilized, each of which is located on one of the opposite surface sides of the stimulable phosphor sheet, the two line sensors detecting two image signals, each of which is made up of a series of image signal components representing pixels in the radiation image, from the opposite surfaces of the stimulable phosphor sheet. Further, the apparatus may be provided with reading means for performing a subtraction process on image signal components of the two image signals, which image signal components represent corresponding pixels on the opposite surfaces of the stimulable phosphor sheet. In such cases, as each of the two line sensors located on opposite surface sides of the stimulable phosphor sheet, a line sensor may be utilized, which is associated with the correction means for compensation for variation in sensitivity among the photoelectric conversion devices constituting the line sensor.

As the stimulable phosphor sheet for energy subtraction processing, it is possible to employ an anisotropic stimulable phosphor sheet, such as a stimulable phosphor sheet, wherein the light emission region of the stimulable phosphor sheet is partitioned by a stimulating ray reflecting partition member, which extends in the thickness direction of the stimulable phosphor sheet, into a plurality of fine cells.

What is claimed is:

1. A radiation image read-out method, comprising the steps of:

i) linearly irradiating stimulating rays, which have been produced by a line light source, onto an area of one surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, with a line sensor comprising a plurality of photoelectric conversion devices, the received light being subjected to photoelectric conversion performed by the line sensor, iii) moving the stimulable phosphor sheet with respect to the line light source and the line sensor and in a direction different from a length direction of the linear area of the stimulable phosphor sheet, and iv) successively reading outputs of the line sensor in accordance with the movement, outputs of the photoelectric conversion devices at respective positions of movement being thereby obtained, wherein the outputs of the line sensor are corrected in accordance with variation in sensitivity among a plurality of pixel regions of the line sensor, which pixel regions are arrayed along the length direction of the linear area of the stimulable phosphor sheet, wherein light having a known light intensity distribution along the length direction of the linear area of the stimulable phosphor sheet is projected onto the line sensor, a correction value is calculated with respect to each of the pixel regions of the line sensor and in accordance with outputs of the pixel regions of the line sensor, which outputs are obtained when the pixel regions of the line sensor receive the projected light, and the output of each of the pixel regions of the line sensor, which output is obtained when each of the pixel regions of the line sensor receives the light emitted by the stimulable phosphor sheet, is corrected in accordance with the thus calculated correction value, wherein correction values, each of which corresponds to one of at least two different levels of incident light intensities upon each of the pixel regions of the line sensor, are calculated, and the output of each of the pixel regions of the line sensor, which output is obtained when each of the pixel regions of the line sensor receives the light emitted by the stimulable phosphor sheet, is corrected in accordance with a level of an incident light intensity of the emitted light and in accordance with the thus calculated correction values, each of which corresponds to one of the at least two different levels of the incident light intensities.

2. A method as defined in claim 1 wherein the stimulable phosphor sheet contains a stimulable phosphor, which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

3. A method as defined in claim 1 wherein the light having the known light intensity distribution along the length direction of the linear area of the stimulable phosphor sheet is light having uniform light intensity distribution along the length direction of the linear area of the stimulable phosphor sheet.

4. A method as defined in claim 1 wherein the light having the known light intensity distribution along the length direction of the linear area of the stimulable phosphor sheet is light which has a light intensity distribution corresponding to the light intensity distribution of the stimulating rays along the length direction of the linear area of the stimulable phosphor sheet.

5. A method as defined in claim 1 wherein the stimulating rays are irradiated onto an area of one surface of a stimulable phosphor sheet, on which a predetermined amount of energy has been stored approximately uniformly, the light, which is emitted from the exposed area of the one surface of the stimulable phosphor sheet exposed to the stimulating rays or from an area of the other surface of the stimulable phosphor sheet corresponding to the exposed area of the one surface of the stimulable phosphor sheet when the stimulating rays are irradiated onto the exposed area of the one surface of the stimulable phosphor sheet, is received with the line sensor, and the correction value with respect to each of the pixel regions of the line sensor is calculated in accordance with the outputs of the pixel regions of the line sensor, which outputs are obtained when the pixel regions of the line sensor receive the light emitted by the stimulable phosphor sheet.

6. A method as defined in claim 1 wherein stimulating rays are irradiated onto an area of one surface of a uniform, anti-Stokes' type of phosphor sheet, light, which is radiated out from the exposed area of the one surface of the anti-Stokes' type of the phosphor sheet exposed to the stimulating rays or from an area of the other surface of the anti-Stokes' type of the phosphor sheet corresponding to the exposed area of the one surface of the anti-Stokes' type of the phosphor sheet when the stimulating rays are irradiated onto the exposed area of the one surface of the anti-Stokes' type of the phosphor sheet, is received with the line sensor, and the correction value with respect to each of the pixel regions of the line sensor is calculated in accordance with the outputs of the pixel regions of the line sensor, which outputs are obtained when the pixel regions of the line sensor receive the light radiated out from the anti-Stokes' type of the phosphor sheet.

7. A method as defined in claim 1 wherein light, which is produced by a reference light source, is projected onto the line sensor, and the correction value with respect to each of the pixel regions of the line sensor is calculated in accordance with the outputs of the pixel regions of the line sensor, which outputs are obtained when the pixel regions of the line sensor receive the light produced by the reference light source.

8. A method as defined in claim 7 wherein the reference light source is constituted of one of an electroluminescence device, a light emitting diode array, and a laser diode array.

9. A radiation image read-out apparatus, comprising:

i) a line light source for linearly irradiating stimulating rays onto an area of one surface of a stimulable phosphor sheet, on which a radiation image has been stored, the stimulating rays causing the stimulable phosphor sheet to emit light in proportion to an amount of energy stored thereon during its exposure to radiation, ii) a line sensor comprising a plurality of photoelectric conversion devices for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, iii) scanning means for moving the stimulable phosphor sheet with respect to the line light source and the line sensor and in a direction different from a length direction of the linear area of the stimulable phosphor sheet, and iv) reading means for successively reading outputs of the line sensor in accordance with the movement in order to obtain outputs of the photoelectric conversion devices at respective positions of movement performed by the scanning means, wherein the improvement comprises the provision of correction means for correcting the outputs of the line sensor in accordance with variation in sensitivity among a plurality of pixel regions of the line sensor, which pixel regions are arrayed along the length direction of the linear area of the stimulable phosphor sheet, wherein the correction means comprises light projecting means for projecting light, which has a known light intensity distribution along the length direction of the linear area of the stimulable phosphor sheet, onto the line sensor, and operation processing means for calculating a correction value with respect to each of the pixel regions of the line sensor and in accordance with outputs of the pixel regions of the line sensor, which outputs are obtained when the pixel regions of the line sensor receive the projected light, and correcting the output of each of the pixel regions of the line sensor, which output is obtained when each of the pixel regions of the line sensor receives the light emitted by the stimulable phosphor sheet, in accordance with the thus calculated correction value, wherein the correction means calculates correction values, each of which corresponds to one of at least two different levels of incident light intensities upon each of the pixel regions of the line sensor, and the correction means corrects the output of each of the pixel regions of the line sensor, which output is obtained when each of the pixel regions of the line sensor receives the light emitted by the stimulable phosphor sheet, in accordance with a level of an incident light intensity of the emitted light and in accordance with the thus calculated correction values, each of which corresponds to one of the at least two different levels of the incident light intensities.

10. An apparatus as defined in claim 9 wherein the stimulable phosphor sheet contains a stimulable phosphor, which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

11. An apparatus as defined in claim 9 wherein the light having the known light intensity distribution along the length direction of the linear area of the stimulable phosphor sheet is light having uniform light intensity distribution along the length direction of the linear area of the stimulable phosphor sheet.

12. An apparatus as defined in claim 9 wherein the light having the known light intensity distribution along the length direction of the linear area of the stimulable phosphor sheet is light which has a light intensity distribution corresponding to the light intensity distribution of the stimulating rays along the length direction of the linear area of the stimulable phosphor sheet.

13. An apparatus as defined in claim 9 wherein the light projecting means irradiates the stimulating rays onto an area of one surface of a stimulable phosphor sheet, on which a predetermined amount of energy has been stored approximately uniformly, and the light projecting means projects the light, which is emitted from the exposed area of the one surface of the stimulable phosphor sheet exposed to the stimulating rays or from an area of the other surface of the stimulable phosphor sheet corresponding to the exposed area of the one surface of the stimulable phosphor sheet when the stimulating rays are irradiated onto the exposed area of the one surface of the stimulable phosphor sheet, onto the line sensor.

14. An apparatus as defined in claim 9 wherein the light projecting means irradiates stimulating rays onto an area of one surface of a uniform, anti-Stokes' type of phosphor sheet, and the light projecting means projects light, which is radiated out from the exposed area of the one surface of the anti-Stokes' type of the phosphor sheet exposed to the stimulating rays or from an area of the other surface of the anti-Stokes' type of the phosphor sheet corresponding to the exposed area of the one surface of the anti-Stokes' type of the phosphor sheet when the stimulating rays are irradiated onto the exposed area of the one surface of the anti-Stokes' type of the phosphor sheet, onto the line sensor.

15. An apparatus as defined in claim 9 wherein the light projecting means projects light, which is produced by a reference light source, onto the line sensor.

16. An apparatus as defined in claim 15 wherein the reference light source is constituted of one of an electroluminescence device, a light emitting diode array, and a laser diode array.

* * * * *